UNITED STATES PATENT OFFICE.

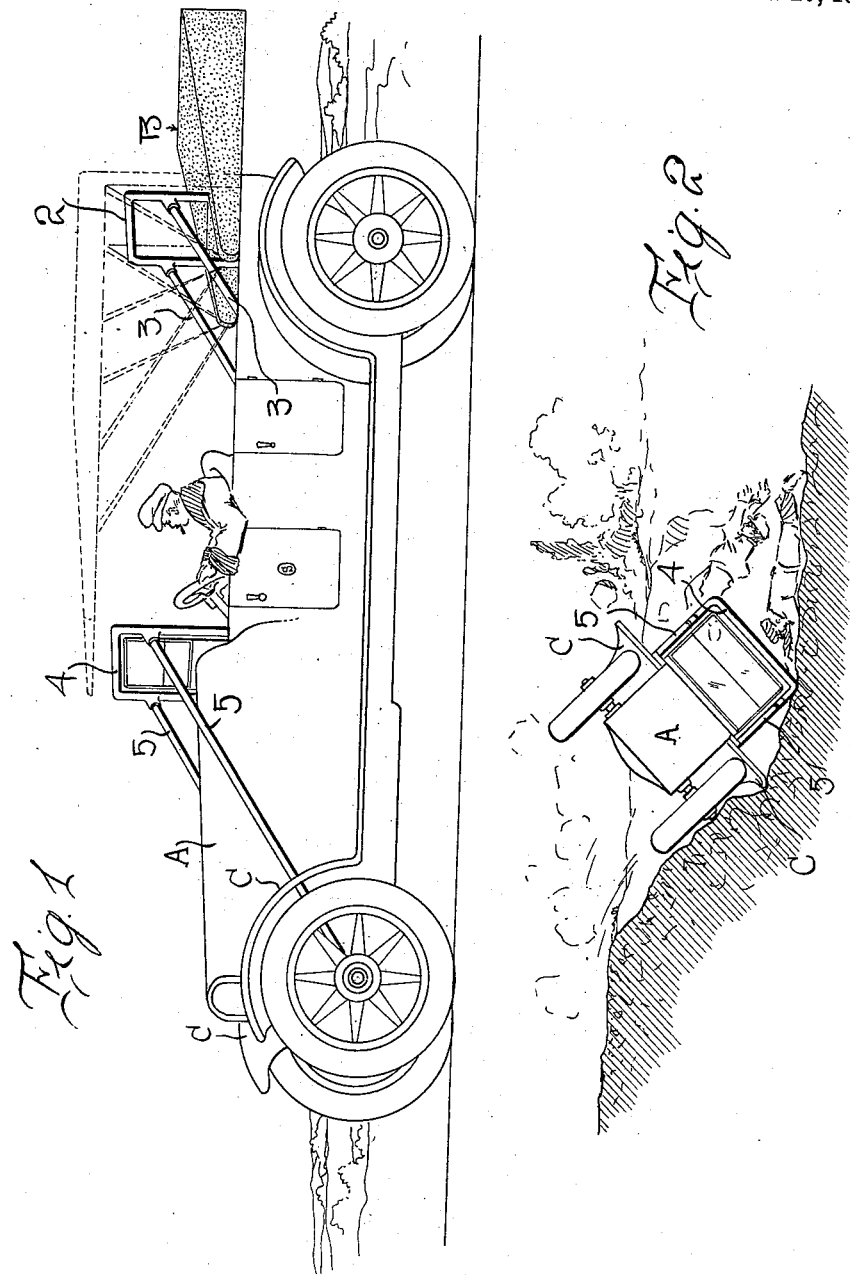

JOHN SCHEIDEMANTEL, OF ELLWOOD CITY, PENNSYLVANIA.

SAFETY DEVICE FOR AUTOMOBILES.

1,200,655.

Specification of Letters Patent.   Patented Oct. 10, 1916.

Application filed November 17, 1915. Serial No. 62,017.

*To all whom it may concern:*

Be it known that I, JOHN SCHEIDEMANTEL, a citizen of the United States, residing at Ellwood City, in the county of Lawrence and State of Pennsylvania, have invented certain new and useful Improvements in Safety Devices for Automobiles, of which the following is a specification, reference being had to the accompanying drawings.

My invention relates to automobile attachments and particularly to means for minimizing the danger to the occupants of an automobile when the latter turns over. Accidents constantly occur wherein an automobile running at a high speed turns over, pinning the occupants of the car beneath it and severely injuring or killing them and rendering it extremely difficult to extract the occupants of the car from beneath the overturned automobile, thus rendering it difficult to give assistance and also rendering them liable to being burned.

The general object of my present invention is the provision of an attachment for automobiles, which, if the automobile turns over, will support the body of the automobile at a distance from the ground so that the occupants will have a chance to escape from beneath the overturned body and so that the overturned body cannot rest upon the riders either during the overturning of the car or afterward, thus rendering it possible for the occupants to escape, if not too severely injured, and also rendering it possible for assistance to be given in the way of drawing or dragging the injured persons out from beneath the car.

A further object of the invention is to provide a very simple device which may be attached to any make of car or made therewith and having the form of relatively strong rigid bows disposed in the forward and rear ends of the automobile so that when the automobile overturns it will rock upon these bows and be supported clear of the ground.

The invention is illustrated in the accompanying drawings, wherein:

Figure 1 is a perspective view of an automobile equipped with my safety devices; Fig. 2 is an end view of an automobile turned over into a ditch and showing the manner in which the safety devices support it in contact with the occupants thereof.

Referring to these figures, A designates an automobile of any usual or ordinary construction. Mounted at the rear of the car, preferably so as to be disposed inward of the bows of the top B, is a transversely extending approximately bow-shaped member 2 which may be formed of steel or iron pipe or other like material which arches transversely across the rear end of the machine. The extremities of this bow are rigidly attached to the frame of the automobile in any suitable manner and the bow is braced by downwardly extending braces 3 which at their lower ends are also rigidly connected to the body of the car and which may be carried down and bear against the longitudinal beams or sills upon which the car body is supported. I do not wish to limit myself to any manner of attaching these braces to the car, nor to any specific arrangement of the braces with relation to any particular portion of the car. At the forward end of the automobile, preferably just in advance of the fore doors is the forward bow 4 which also arches over the car transversely and which is made of the same material as the rear bow and which is rigidly connected to the body of the car in any suitable manner. Braces 5 extend downward from the bow 4 and these braces may engage the front axle if necessary, passing down behind the mud guards C to that end. I do not wish in this case, however, to be limited to any exact positioning of these braces 5. It suffices if the bows 2 and 4 are rigidly attached to the car so that they will withstand the strain and are braced in such manner as not to readily give or yield under shock. The arch-shaped bow 4 is preferably large enough so that the wind shield D may be disposed within the bow but this bow might also be used as part of the frame of the wind shield, if desired. The bow 2 has preferably a height less than that of the bows supporting the top so that the top will turn inward over the bows 2, as illustrated in dotted lines in Fig. 1.

The practical use of my invention will be obvious. If the car should "turn turtle" when running at high speed, the bows will engage with the ground and the car will be prevented from overturning completely, or if for any reason the car should completely overturn the bows will support the body of the car above the ground so that there will be ample space for the occupants of the car to escape from beneath the automobile. Inasmuch as the braces 3 and 5 extend forward they will tend to prevent any rearward deflection of the bows 2 and 4 upon the overturning of the car. The construction is simple, may be easily applied to all makes of cars, and will insure the relative safety of the occupants in overturning.

Having described the invention, what I claim is:

The combination with an automobile having a top and a wind shield, of a rear approximately bow-shaped supporting member formed of rigid material arching over the rear end of the car and attached thereto and being less in height and width than the bows of the top, and a forward transversely extending approximately bow-shaped member rigidly attached to the car and disposed forward of the fore doors and defining a wind shield space, and braces extending downward and forward from said bow-shaped member and connected to the body of the car.

In testimony whereof I hereunto affix my signature in the presence of two witnesses.

JOHN SCHEIDEMANTEL.

Witnesses:
 Jos. W. Humphrey,
 Rebecca McConahy.

Copies of this patent may be obtained for five cents each, by addressing the "Commissioner of Patents, Washington, D. C."